Dec. 1, 1931.    E. T. HARNEY    1,834,703
TYPEWRITER ESCAPEMENT MECHANISM
Filed June 21, 1928    2 Sheets-Sheet 1

Inventor
EMMET T. HARNEY
by Hammond & Littell
Attys

Inventor
EMMET T. HARNEY

Patented Dec. 1, 1931

1,834,703

UNITED STATES PATENT OFFICE

EMMET T. HARNEY, OF GARWOOD, NEW JERSEY, ASSIGNOR OF ONE-HALF TO NELSON LITTELL, OF NEW CANAAN, CONNECTICUT

TYPEWRITER ESCAPEMENT MECHANISM

Application filed June 21, 1928. Serial No. 287,120.

This invention relates to typewriting machines and more particularly to carriage escapement mechanism therefor.

An object of the invention is to simplify the escapement mechanism so as to effect economy by novel features of construction and eliminate a number of parts formerly used. A more efficient mechanism is thus produced since there are less parts used than heretofore to bring about the desired results.

A feature of the invention relates to improved means associated with the loose dog of the escapement to limit the movement in one direction of an oscillating dog rocker upon which the loose dog and a fixed dog are supported; said dogs cooperating with the escapement wheel.

Another feature of the invention relates to means on the loose dog to prevent excessive back rotation of the escapement wheel while the carriage is being returned.

Still another feature relates to novel means on the dog rock to arrest the loose dog in its operated position.

By the above improvements seven parts used heretofore are eliminated as hereinafter pointed out.

Other features and advantages will hereinafter appear.

Figure 1:
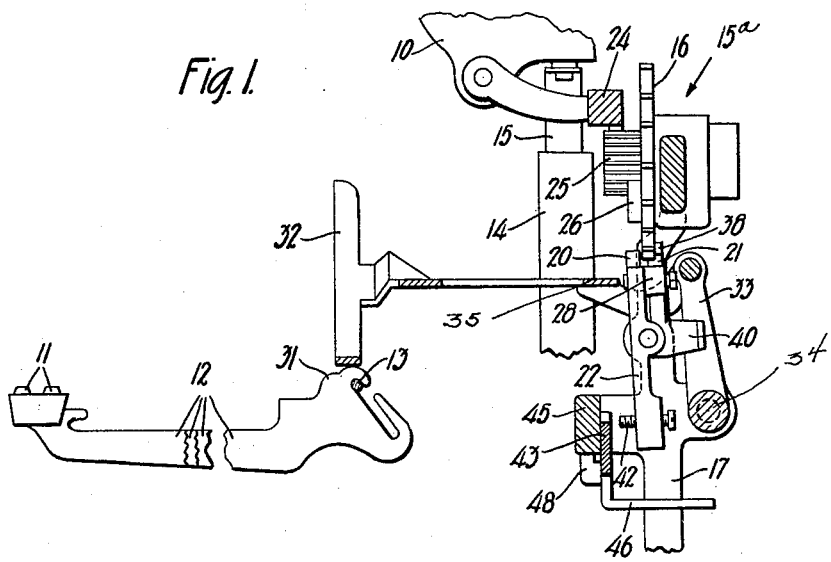
Figure 1 is a sectional side elevation of sufficient of a typewriting machine to illustrate the application of the invention.

The invention is herein illustrated as applied to an Underwood typewriting machine including a carriage 10 which supports a platen (not shown) around which a work sheet to be typed upon is fed. The work sheet may be typed upon by types 11 of type bar 12 operable in the usual way by keys (not shown); the type bars, to print, being swung individually upwardly and rearwardly about a fulcrum rod 13 to strike against the paper on the platen.

To letter feed the carriage 10, there is connected to it a spring drum 14 by means of a strap 15. An escapement 15a controls the step-by-step or letter feeding movements of the carriage; said escapement including an escapement wheel 16 rotatively supported in a bracket 17 and cooperating with a fixed dog 20 and a loose dog 21 of a dog rocker 22 supported on pivot pins 23 in the bracket 17.

The carriage 10 is provided with the usual feed rack 24 meshing with a pinion 25 to rotate the escapement wheel 16 through the usual one way driving connection including a spring pressed pawl 26, the escapement wheel normally engaging the loose dog and holding it in contact with a stop 28 of the dog rocker against the action of a spring 30.

During the upward swing of any one of the typebars 12 a heel 31 thereon engages a universal bar 32 to push the latter rearwardly against the action of a spring (not shown). The universal bar 32 is guided at its rear end by a frame 33 pivoted at 34 on the bracket 17. A cross bar 35 of the universal bar engages the upper end of the dog rocker to push it rearwardly in Figure 1 against the action of the spring 30 which is diagonally disposed and extends forwardly and laterally from the dog 21. The loose dog 21 is thus released from the escapement wheel and is swung to the position in Figure 4 by the spring 30, said dog being arrested in this position by a stop 36 which, in the present invention is formed directly on the dog rocker. Said stop 36 substitutes three parts used heretofore, namely, a dog arresting stop, a bracket to support said stop and a screw for securing the stop supporting bracket employed in the Underwood machine.

Figure 3:
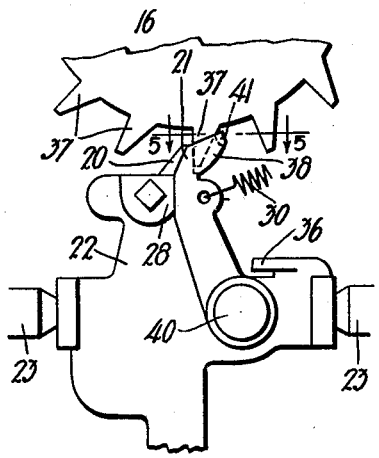
Figure 3 is an enlarged rear view showing the normal relation of escapement wheel and the cooperating dogs supported by the dog rocker.
Figure 4:
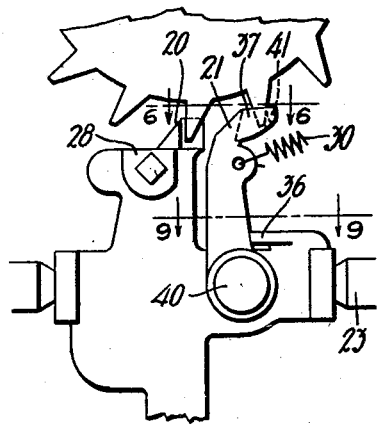
Figure 4 is a view similar to Figure 3 but showing the relation of parts after the first half cycle of operation of the dog rocker.
Figure 5:
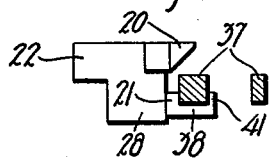
Figure 5 is a sectional view taken on the line 5—5 of Figure 3.
Figure 6:
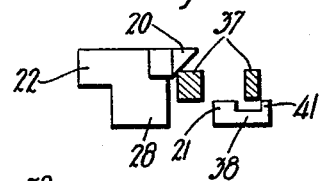
Figure 6 is a sectional view taken on the line 6—6 of Figure 4.

Before the loose dog is released from the escapement wheel the fixed dog is brought into the path of said wheel so that the active one of the teeth 37, of the escapement wheel, may drop from the loose dog and advance slightly, under the action of the spring drum 14, to the fixed dog 20, from the position in Figures 3 and 5 to the position in Figures 4 and 6. Upon the return stroke of the type bar the universal bar 32 returns to normal and consequently the dog rocker is returned to normal by the spring 30, permitting rotation of the escapement wheel through the space of one tooth thereof.

Figure 7:
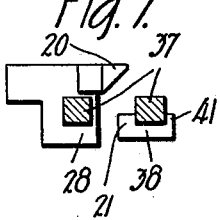
Figure 7 is a view similar to Figures 5 and 6 but shows the dog rocker returned to normal and the loose dog being returned to normal by the escapement.
Figure 8:
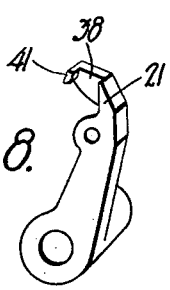
Figure 8 is a perspective view of the loose dog.
Figure 9:
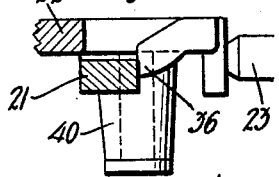
Figure 9 is a sectional top plan view taken on the line 9—9 of Figure 4 and shows the stop for the loose dog.

Novel means is provided to arrest the dog rocker 22 in its normal position. To this end the loose dog is provided with means which may include an extension 38 which engages the teeth 37, one at a time, as indicated in Figures 3 and 7. While the projection 38 is moving into engagement with the escapement wheel, upon the return movement of the dog rocker, the loose dog 21 is brought into the path of the next tooth 37 which engages the loose dog to return it to the stop 28 and against the action of the spring 30. The pivot bearing 40 of the loose dog is long or broad (Figures 1 and 9) to readily withstand any side pressure on the dog which would otherwise tend to produce looseness. The extension 38 eliminates another part heretofore necessary, namely, the usual stop screw which ordinarily engages the lower end of the dog rocker and there is no adjustment required as heretofore to get the desired overlap between the loose dog and the tooth of the escapement wheel and position the fixed dog with respect to the escapement wheel.

Novel means is also provided to prevent excessive backward rotation of the escapement wheel while the carriage is being returned to normal. To this end the extension 38 is provided with a projection 41 which serves as a back stop; said stop being in the path of the teeth of the escapement wheel when the dog rocker 22 is in normal position. Upon the return movement of the carirage 10, in a back spacing operation, the escapement wheel starts its backward rotation and consequently the loose dog is swung against the stop 36 by the spring 30, Figure 4. Further backward rotation of the escapement wheel is then prevented by the extension 41 on the projection 38, which engages the rear side of one of the teeth 37.

By the present back stop projection 41 three more parts are eliminated from the Underwood machine, namely, the usual back stop pawl or wheel check normally located to the left of the stop 28 on the dog rocker 22, its pivot screw and its return spring.

Figure 2:
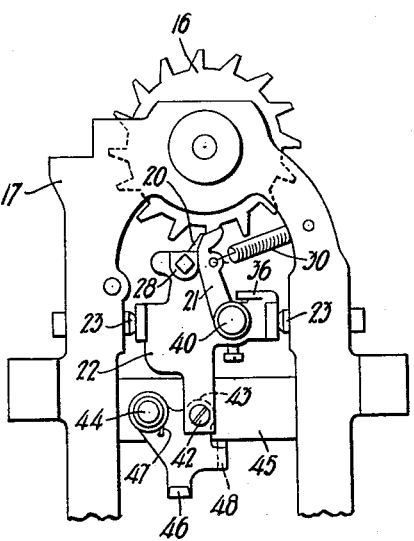
Figure 2 is a rear view of the escapement mechanism and its supporting bracket with parts removed for clarity of illustration.

The dog rocker is arrested in its first half cycle of movement by a set screw 42 which engages a stop 43 pivoted on a stud 44 of a cross bar 45 of the escapement bracket 17. The stop 43 may be swung out of the path of the set screw 42 by a handle 46 so as to enable the dog rocker to be actuated through a grater distance in order that the universal bar may be pushed sufficiently rearward to enable the removal of any one of the type bars in the usual way. The stop 43 is held in its normal position, Figure 2, by a spring 47 wound about the axis of the pivot stud 44 and is provided with a projection 48 engaging under the cross bar 45 to determine its position. The use of the projection 48 which can be formed integral with the stop 43 further eliminates two additional parts of the usual Underwood escapement mechanism, namely, the set screw and a set screw lock which acts in place of the projection 48.

Thus by the present improvement seven individual parts are eliminated from the escapement mechanism per se used heretofore and two parts are eliminated from the dog rocker stop. This not only greatly economizes in the production of the machine and also economizes in labor since there are fewer parts to be handled but at the same time provides for a more flexible and faster operation of the machine with less likelihood of it getting out of order.

It will be understood, that the application of the invention is not limited to an Underwood typewriting machine herein described, but that it may also be applied to other typewriting machines and that modifications and changes may be made in the specific embodiment illustrated without departing from the spirit of the invention or the scope of the appended claims.

What I claim as my invention is:

1. A typewriter escapement including a rotatable, toothed wheel, a dog rocker to oscillate transversely of the wheel, a fixed dog on the dog rocker, a loose dog on the dog rocker, said dogs cooperating with the teeth of said wheel to permit feeding movement of said wheel when the dog rocker is oscillated, said loose dog being provided with a pair of spaced projections adapted normally to extend one in front of and one behind a tooth of said wheel.

2. A typewriter escapement including a rotatable, toothed wheel, a dog rocker to oscillate transversely of the wheel, a fixed dog on the dog rocker, a loose dog on the dog rocker, said dogs cooperating with the teeth of said wheel to permit feeding movement of said wheel when the dog rocker is oscillated, said loose dog being provided with a pair of spaced projections adapted normally to extend one in front of and one behind a tooth of said wheel and stop means to limit the movement of the movable dog in either direction.

3. A typewriter escapement including a rotatable toothed wheel, a dog rocker to oscillate transversely of the wheel, a fixed dog on the dog rocker, a loose dog on the dog rocker, means to limit the movement of the dog rocker in one direction, including a pivoted removable stop and means integral therewith to hold the stop in operative position, said dogs cooperating with the teeth of said wheel to permit feeding movement of said wheel when the dog rocker is oscillated, and an extension on the loose dog to limit the movement of the dog rocker in the other direction.

4. A typewriter escapement including a rotatable toothed wheel, a dog rocker to oscillate transversely of said wheel, a fixed dog on the dog rocker, a loose dog on the dog rocker, means to limit the movement of the dog rocker in one direction, said dogs cooperating with the teeth of said wheel, and an extension on the loose dog to engage the side of the teeth of said wheel to arrest the dog rocker in its normal position.

5. A typewriter escapement including a rotatable toothed wheel, a dog rocker to oscillate transversely of said wheel, a fixed dog on the dog rocker, a loose dog on the dog rocker, means to limit the movement of the dog rocker in one direction, said dogs cooperating with the teeth of said wheel, an extension on the loose dog to engage the side of the teeth of said wheel to arrest the dog rocker in its normal position and a projection on said extension to limit the backward rotation of said toothed wheel.

6. In a typewriting machine the combination of a carriage, an escapement wheel, a one-way driving connection between said carriage and said wheel, an oscillatory dog rocker, a fixed dog, a loose dog, both of said dogs supported on said dog rocker and cooperating with the escapement wheel to permit step-by-step movements thereof during the oscillatory movements of the dog rocker, an extension on the loose dog to engage the wheel to limit the movement of the dog rocker and a projection on said extension to prevent excessive backward rotation of the escapement wheel.

7. A typewriter escapement mechanism, including a rotatable toothed wheel, a dog rocker to oscillate transversely of the wheel, a fixed dog on the dog rocker, a loose dog on the dog rocker provided with a pair of teeth adapted to normally extend one in front of and one behind a tooth of said wheel, said dogs cooperating with the teeth of said wheel to permit feeding movement of said wheel when the dog rocker is oscillated, said loose dog serving both as a back stop and a front stop for said escapement wheel.

8. A typewriter escapement including a rotatable toothed wheel, a dog rocker adapted to oscillate transversely of the wheel, a fixed dog on the dog rocker, a loose dog on the dog rocker, said dogs cooperating with the teeth of said wheel to permit feeding movement of the wheel when the dog rocker is oscillated, means for limiting the movement of the loose dog and a projection on said loose dog adapted to engage the face of a tooth of the wheel to prevent excessive back rotation of the escapement when the carriage is being returned and to engage the side of a tooth to limit the movement of the dog rocker.

9. A typewriter escapement including a rotatable toothed wheel, a dog rocker adapted to oscillate transversely of the wheel, a fixed dog on the dog rocker, a loose dog on the dog rocker, said dogs cooperating with the teeth of said wheel to permit feeding movement of said wheel when the dog rocker is oscillated, means for limiting the movement of the loose dog, and a projection on said loose dog adapted to engage the wheel to prevent excessive back rotation of the escapement when the carriage is being returned said loose dog and said projection extending in front of and back of a single tooth of said wheel and resting against the side of said tooth.

In testimony whereof I have affixed my signature to this specification.

EMMET T. HARNEY.